(12) United States Patent
Mochiyoshi

(10) Patent No.: US 9,552,082 B2
(45) Date of Patent: Jan. 24, 2017

(54) INPUT DEVICE

(71) Applicant: Mochiyoshi Engineering Development Co., Ltd., Saitama (JP)

(72) Inventor: Yuya Mochiyoshi, Saitama (JP)

( * ) Notice: Subject to any disclaimer, the term of this patent is extended or adjusted under 35 U.S.C. 154(b) by 0 days.

(21) Appl. No.: 14/998,748

(22) Filed: Dec. 24, 2015

(65) Prior Publication Data

US 2016/0162041 A1   Jun. 9, 2016

Related U.S. Application Data

(63) Continuation of application No. PCT/JP2014/066428, filed on Jun. 20, 2014.

(30) Foreign Application Priority Data

Jun. 24, 2013  (JP) ................................ 2013-132148

(51) Int. Cl.
*G06F 3/0338* (2013.01)
*G05G 9/047* (2006.01)
*G06F 3/033* (2013.01)
*A63F 13/24* (2014.01)

(52) U.S. Cl.
CPC ............. *G06F 3/0338* (2013.01); *A63F 13/24* (2014.09); *G05G 9/047* (2013.01); *G06F 3/0334* (2013.01)

(58) Field of Classification Search
CPC . G06F 3/014; G06F 2203/0331; G06F 3/0338
See application file for complete search history.

(56) References Cited

U.S. PATENT DOCUMENTS

| | | | |
|---|---|---|---|
| 4,795,952 A | 1/1989 | Brandstetter | |
| 6,059,660 A * | 5/2000 | Takada | G05G 9/047 273/148 B |
| 6,459,420 B1 * | 10/2002 | Harris | A63F 13/06 345/156 |
| 2002/0149563 A1 * | 10/2002 | Swofford | G06F 3/038 345/161 |
| 2011/0016609 A1 * | 1/2011 | Phelps | A41D 19/0024 2/162 |

FOREIGN PATENT DOCUMENTS

| | | |
|---|---|---|
| JP | 11-154031 | 6/1999 |
| JP | 2004-227266 | 8/2004 |

OTHER PUBLICATIONS

Written Opinion of the ISA in corresponding WIPO application PCT/JP2014/066428, Sep. 9, 2014.

* cited by examiner

*Primary Examiner* — Viet Pham
(74) *Attorney, Agent, or Firm* — Ryan Alley IP

(57) ABSTRACT

Input devices allow a hand and/or fingers to relay input to machines. Input devices include an operation unit coupled with an X-, Y-, and/or Z-axis sensor that detects movement of the operation unit by a human hand for input. The operation unit includes a base configured to receive a thumb on the hand of a human operator and a cover that covers the thumb. A frontwall blocks further movement in front of the cover. Input devices may further include a base or cover nail configured to hook the thumb for backward pulling.

5 Claims, 29 Drawing Sheets

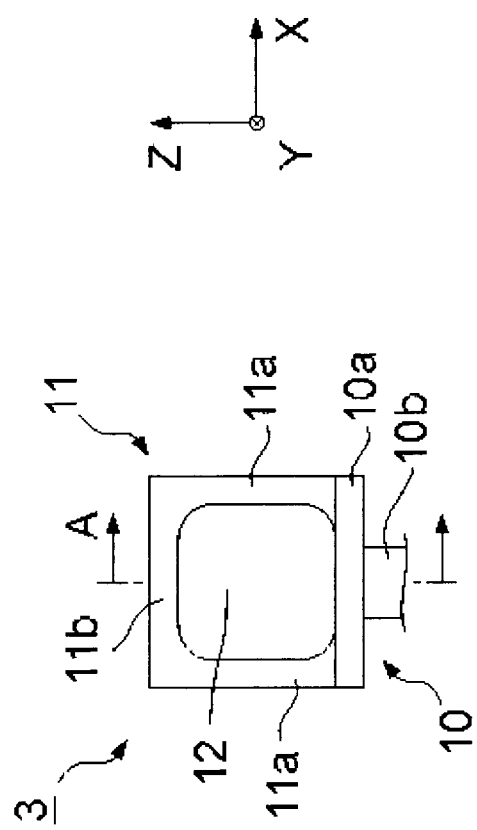

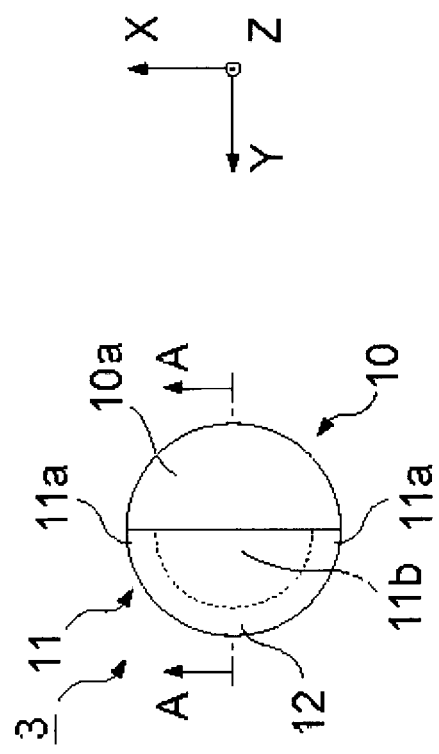

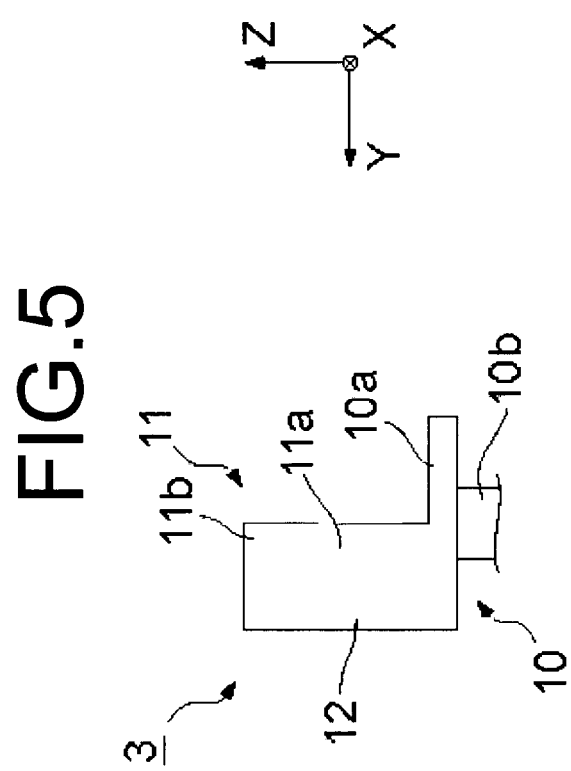

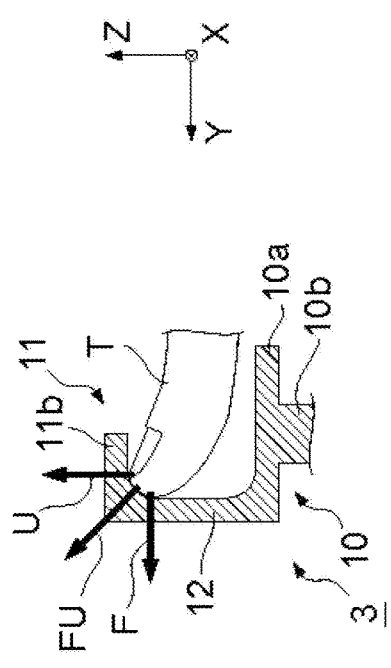
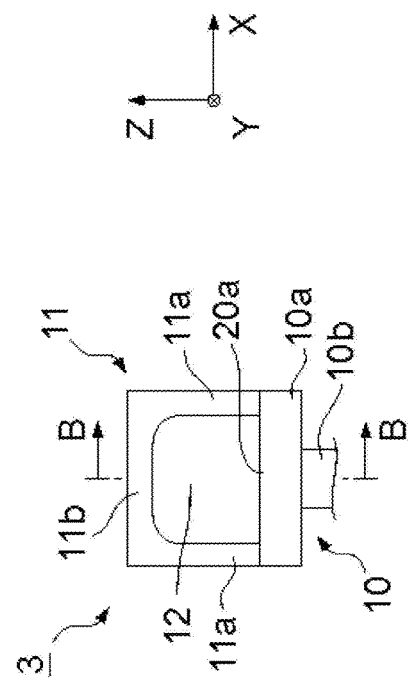

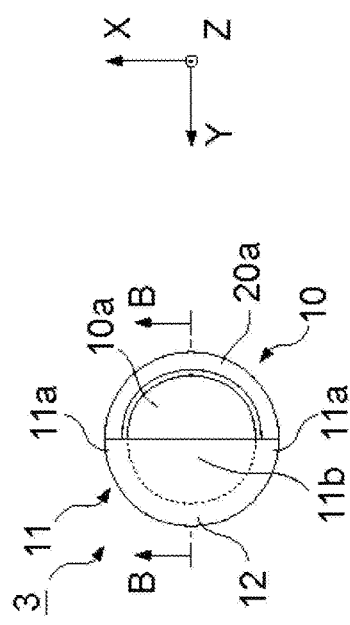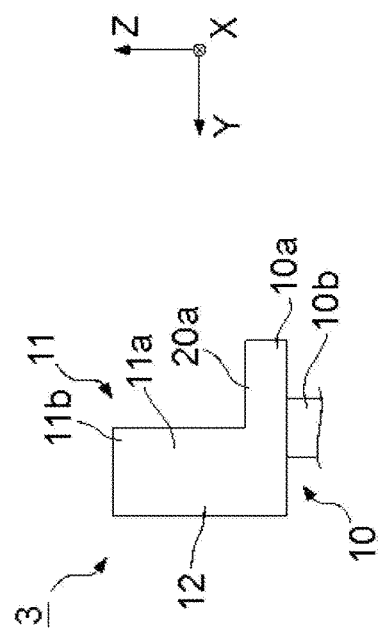

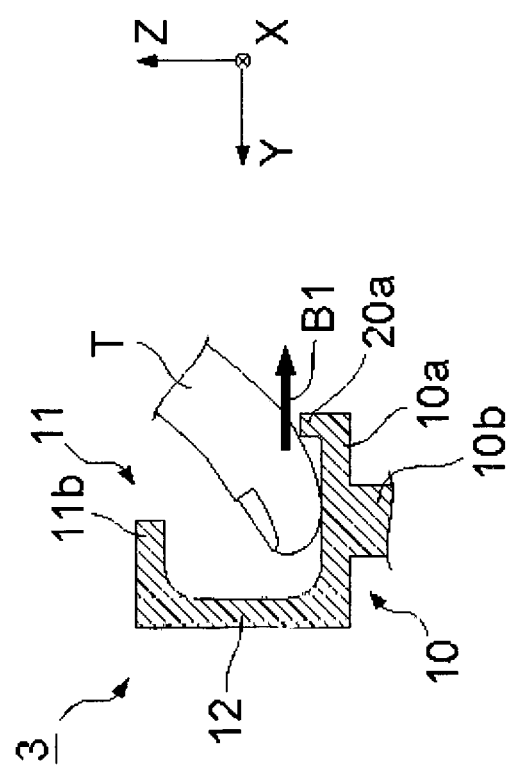

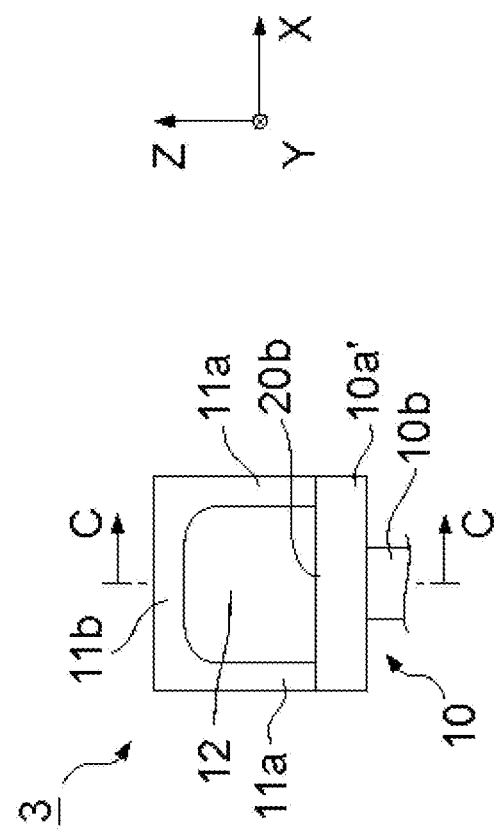

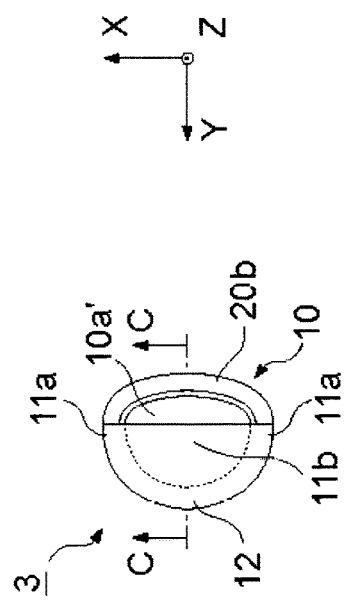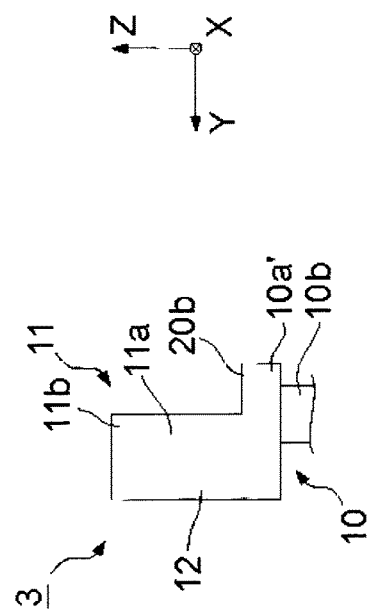

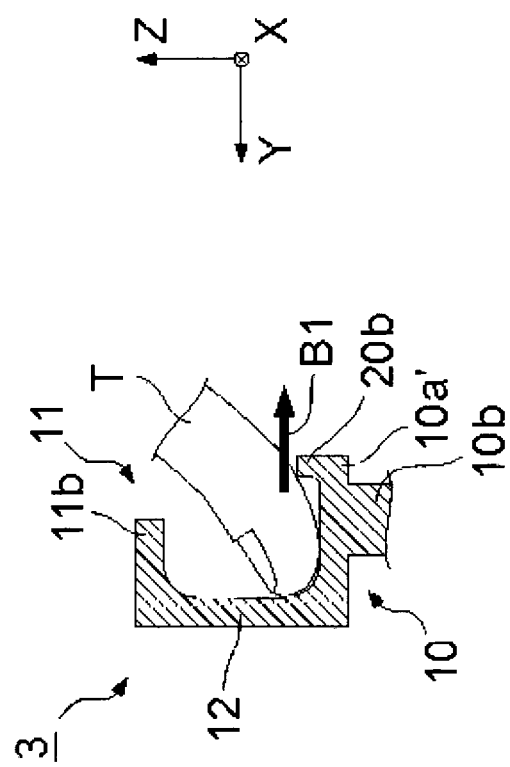

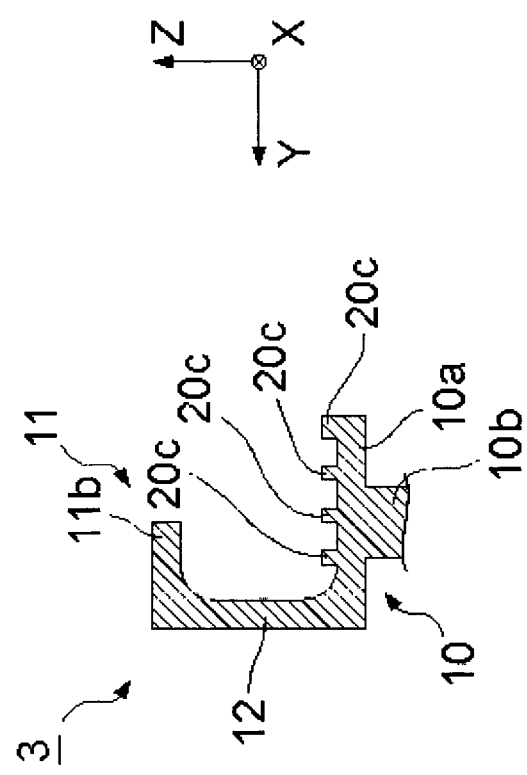

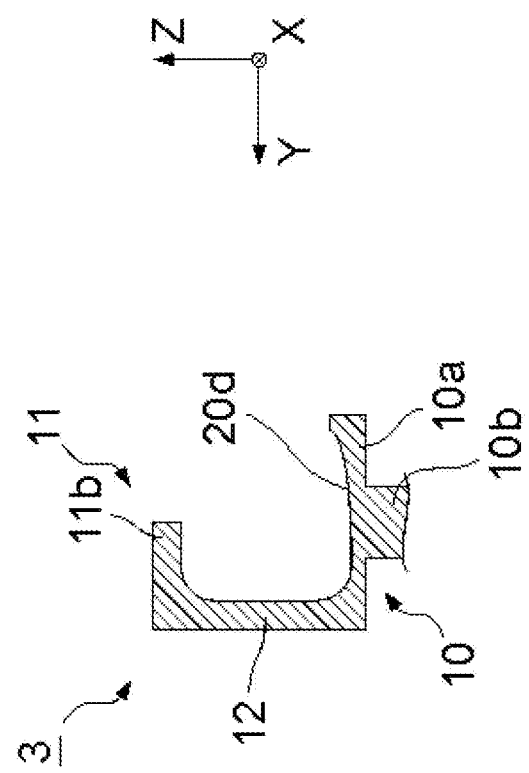

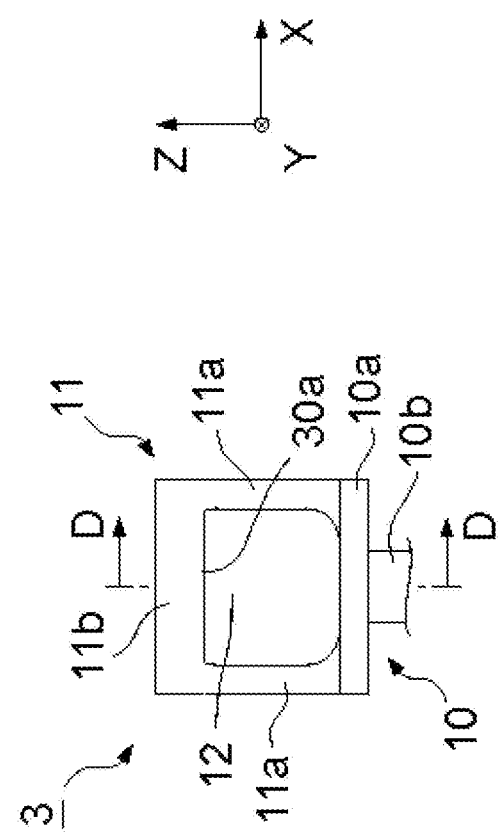

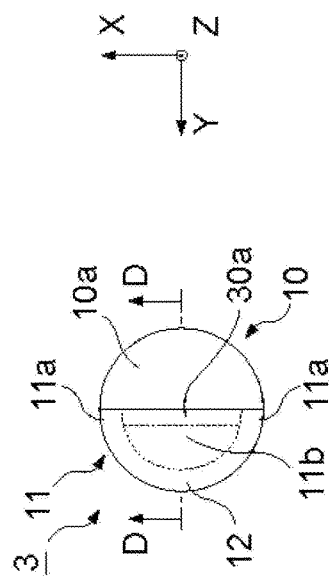
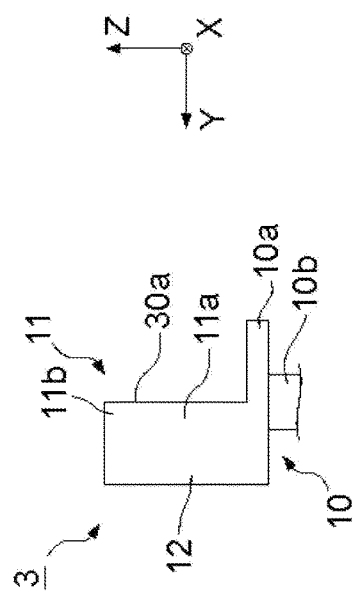

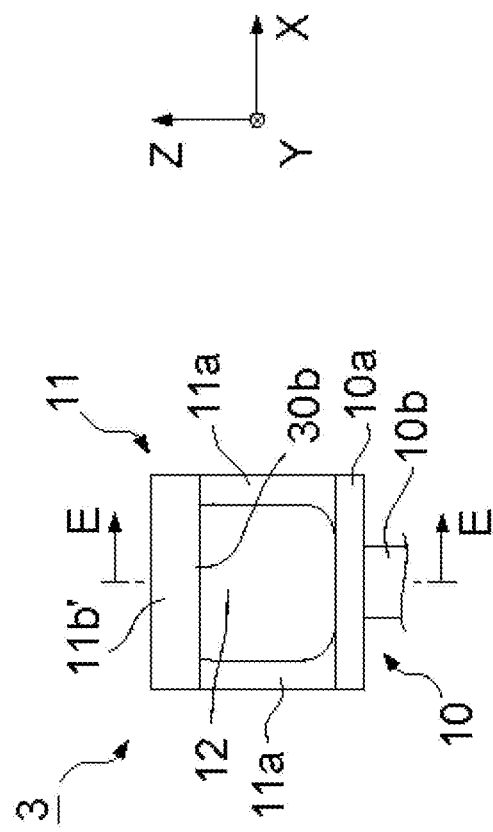

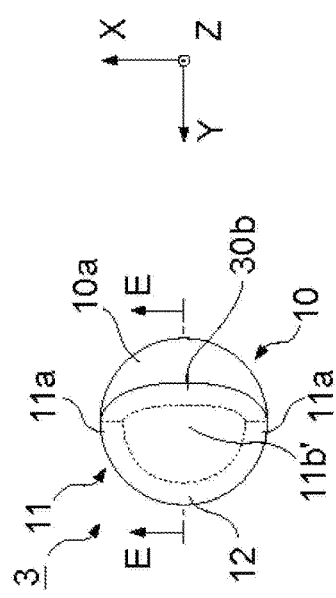
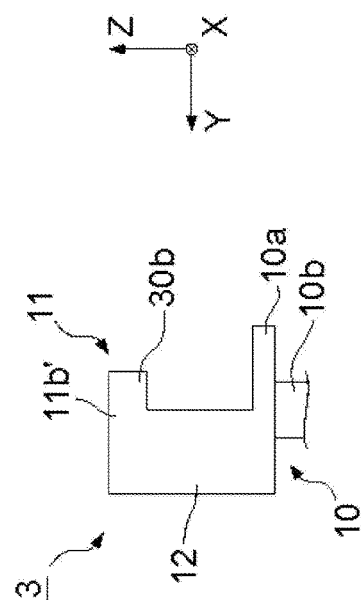

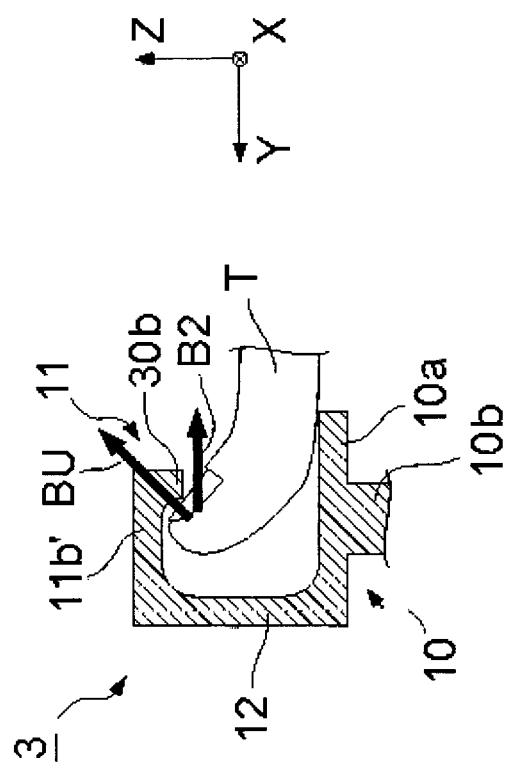

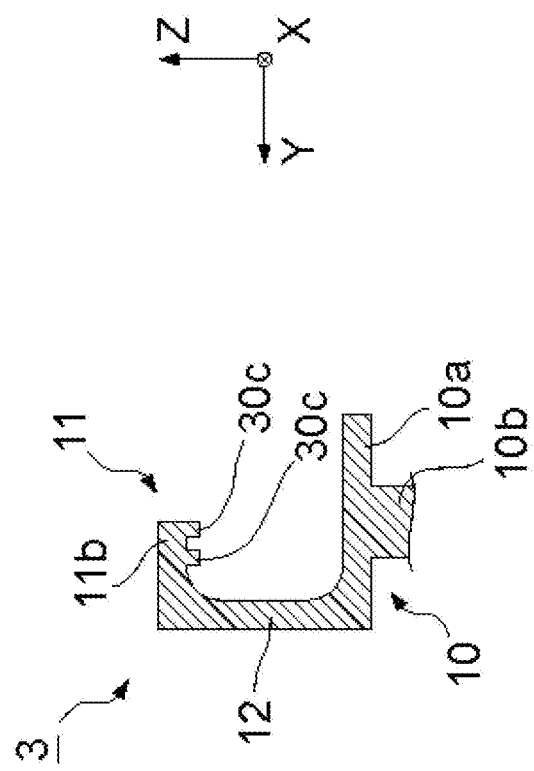

INPUT DEVICE

RELATED APPLICATIONS

This application claims priority under 35 U.S.C. §120 to, and is a continuation of, International Application PCT/JP2014/066428, filed Jun. 20, 2014 and designating the US, which claims priority to Japanese Application 2013-132148 filed Jun. 24, 2013. These Japanese and International Applications are incorporated by reference herein in its entirety

BACKGROUND

Conventionally, an input device is known that aims at an intuitive and easy input operation along XYZ-axes, i.e. three dimensional (ref. patent document 1). The patent document 1 discloses: when an operator of the input device inserts the thumb into a ring portion and moves the thumb upward and downward, a finger stick portion moves upward and downward, allowing an input operation of various devices in Z-axis direction (ref. patent document 1). The above-mentioned conventional art allows the finger stick portion to easily move upward and downward when the operator moves the thumb upward and downward.

SUMMARY

Example methods and embodiments include controllers for human input to machines. Example embodiments include all operation unit and X/Y/Z-axis detectors that detect relative movement of the operation unit with respect to a controller body. The operation unit includes a base configured to receive a thumb on the hand of a human operator and a cover that covers the thumb. A frontwall blocks further movement in front of the cover. Example embodiments may further include a base or cover nail configured to hook the thumb for backward pulling.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

FIG. 3 is an elevation back view that shows an operation unit of an input device according to the first embodiment.

FIG. 4 is a plan top view that shows an operation unit of an input device according to the first embodiment.

FIG. 5 is a left side view that shows an operation unit of an input device according to the first embodiment.

FIG. 6 is a sectional view that shows A-A section of an input device according to the first embodiment.

FIG. 7 is an elevation back view that shows an operation unit of an input device according to the second embodiment.

FIG. 8 is a plan top view that shows an operation unit of an input device according to the second embodiment.

FIG. 9 is a left side view that shows an operation unit of an input device according to the second embodiment.

FIG. 10 is a sectional view that shows B-B section of an input device according to the second embodiment.

FIG. 11 is an elevation back view that shows an operation unit of an input device according to the second embodiment, variation 1.

FIG. 12 is a plan top view that shows an operation unit of an input device according to the second embodiment, variation 1.

FIG. 13 is a left side view that shows an operation unit of an input device according to the second embodiment, variation 1.

FIG. 14 is a sectional view that shows C-C section of an input device according to the second embodiment, variation 1.

FIG. 15 is a sectional view that shows B-B section of an input device according to the second embodiment, variation 2.

FIG. 16 is a sectional view that shows B-B section of an input device according to the second embodiment, variation 3.

FIG. 18 is an elevation back view that shows an operation unit of an input device according to the third embodiment.

FIG. 19 is a plan top view that shows an operation unit of an input device according to the third embodiment.

FIG. 20 is a left side view that shows an operation unit of an input device according to the third embodiment.

FIG. 22 is an elevation back view that shows an operation unit of an input device according to the third embodiment, variation 1.

FIG. 23 is a plan top view that shows an operation unit of an input device according to the third embodiment, variation 1.

FIG. 24 is a left side view that shows an operation unit of an input device according to the third embodiment, variation 1.

FIG. 25 is a sectional view that shows E-E section of an input device according to the third embodiment, variation 1.

FIG. 26 is a sectional view that shows D-D section of an input device according to the third embodiment, variation 2.

DETAILED DESCRIPTION

Figure 1:
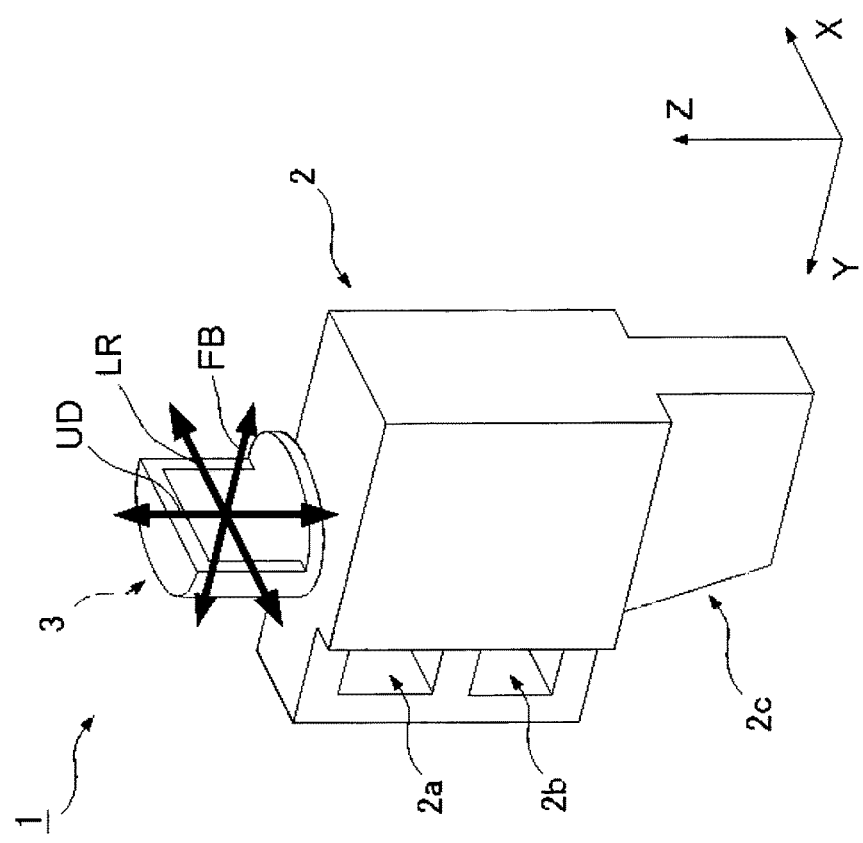
FIG. 1 is a perspective view that schematically depicts an input device according to the first embodiment.

This is a patent document, and general broad rules of construction should be applied when reading it. Everything described and shown in this document is an example of subject matter falling within the scope of the claims, appended below. Any specific structural and functional details disclosed herein are merely for purposes of describing how to make and use example embodiments. Several different embodiments not specifically disclosed herein may fall within the claim scope; as such, the claims may be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when element(s) are referred to in relation to one another, such as being "connected," "coupled," "mated," "attached," or "fixed" to another element(s), the relationship can be direct or with other intervening elements. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.). Similarly, a term such as "connected" for communications purposes includes all variations of information exchange routes between two devices, including intermediary devices, networks, etc., connected wirelessly or not.

As used herein, the singular forms "a", "an," and "the" are intended to include both the singular and plural forms, unless the language explicitly indicates otherwise with terms like "only a single element." It will be further understood that the terms "comprises," "comprising," "includes," and/or "including," when used herein, specify the presence of stated features, values, steps, operations, elements, and/or components, but do not themselves preclude the presence or addition of one or more other features, values, steps, operations, elements, components, and/or groups thereof.

It should also be noted that the structures and operations discussed below may occur out of the order described and/or noted in the figures. For example, two operations and/or figures shown in succession may in fact be executed concurrently or may be executed in the reverse order, depending upon the functionality/acts involved. Similarly, individual operations within example methods described below may be executed repetitively, individually or sequentially, so as to provide looping or other series of operations. It should be presumed that any embodiment having features and functionality described below, in any workable combination, falls within the scope of example embodiments.

The Inventor has recognized that existing input controllers require an operator to move the finger-stick portion of the controller while the operator inserts the thumb into the ring portion. With this thumb configuration, it may be difficult for a human hand to move the finger-stick portion to a direction other than upward and downward. For example, when the finger stick-portion is moved forward and upward, movement both frontward and upward causes the thumb to enter into the ring portion. Thus, it is difficult to move the finger-stick portion both frontward and upward.

Example embodiments discussed below uniquely enable solutions to these and other input device problems newly recognized by the Inventor.

The present invention is input devices and methods of creating and operating the same that advantageously allow intuitive and easy operator input. In contrast to the present invention, the few example embodiments and example methods discussed below illustrate just a subset of the variety of different configurations that can be used as and/or in connection with the present invention.

In each figure, arrow X indicates a direction to left in a transverse direction (X-axis direction), arrow Y indicates a front direction in a longitudinal direction (Y-axis direction) and arrow Z indicates a direction to left in a up and down direction (Z-axis direction), respectively. In other words, XY-axis-direction indicates horizontal direction and Z-axis-direction indicates vertical direction, respectively.

Hereinafter, the first embodiment of the input device is described with reference to FIG. 1. First, the entire configuration of the input device according to the first embodiment will be set forth. As depicted in FIG. 1, the input device 1 according to this embodiment is provided with body 2 and operation unit 3. The body 2 is provided with circular index-finger insert hole 2a in which an operator inserts an index finger at front of the body 2 and circular middle-finger insert hole 2b in which an operator inserts a middle finger at front of the body 2 so that the operator grasps the input device 1. Further, a lower portion of the body 2 is provided with a supporter 2c that an operator uses to hold the body 2 by a ring finger and a little finger so that the operator grasps the input device 1. As set forth, the shape of the body 2 is formed to allow the operator to easily grasp the input device 1 in one hand and support the input device 1. The operation unit 3 is movable with regard to the body 2 as depicted by arrows LR, FB and UD.

Figure 2:
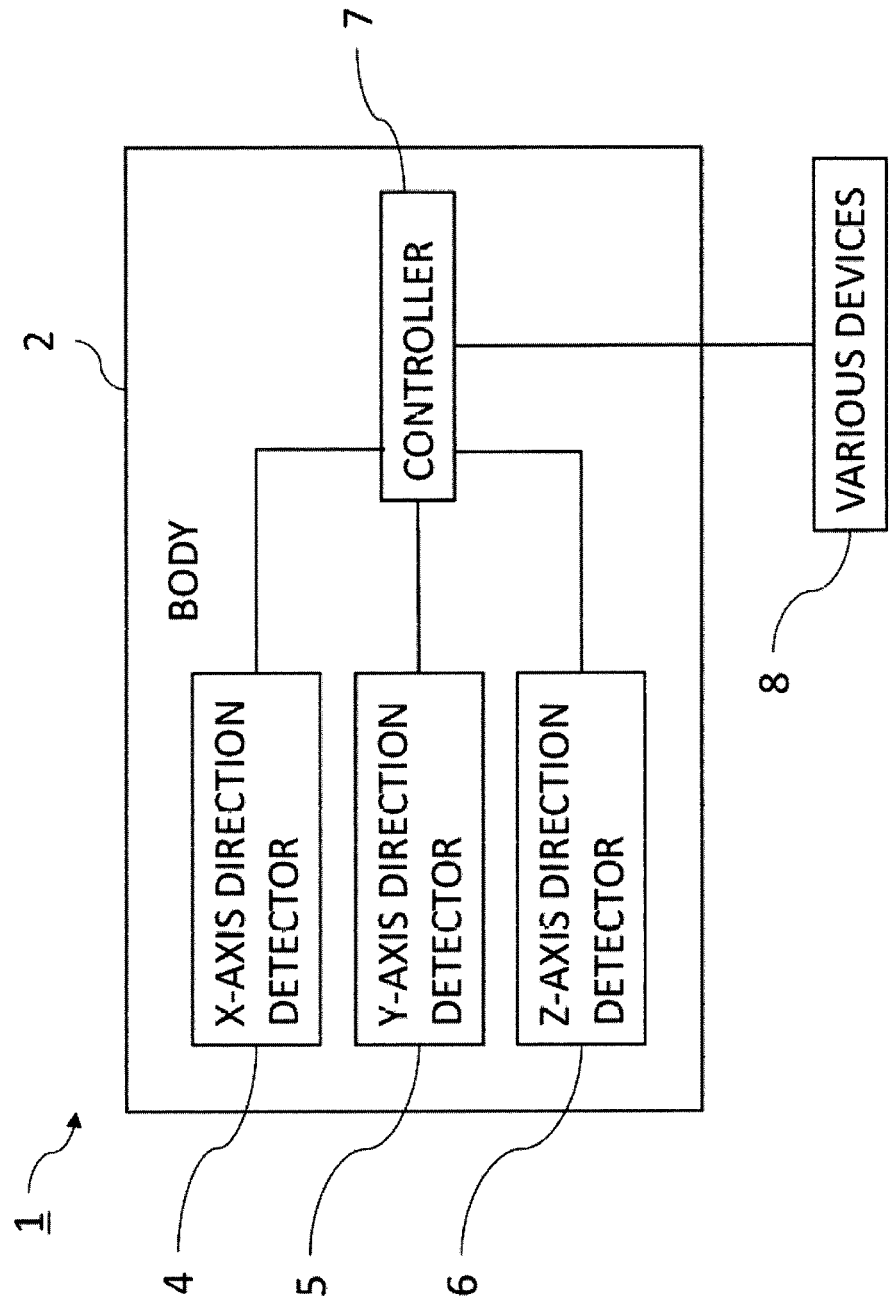
FIG. 2 is a block diagram of controlling an input device according to the first embodiment.

As depicted in FIG. 2, the input device 1 according to this embodiment is provided with X-axis detector 4, Y-axis detector 5, Z-axis detector 6 and controller 7. X-axis detector 4 detects movement of the operation unit 3 in X-axis direction as shown by arrow LR. Y-axis detector 5 detects movement of the operation unit 3 in Y-axis direction as shown by arrow FB. Z-axis detector 6 detects movement of the operation unit 3 in Z-axis direction as shown by arrow UD. X-axis detector 4, Y-axis detector 5 and Z-axis detector 6 are typically embodied by adjustable resistors, optical sensors, magnetic sensors or acceleration sensors, so as to detect relative positional changes of the operation unit 3 with regard to the body 2.

The controller 7 receives signals based on the detection result by X-axis detector 4, Y-axis detector 5 and Z-axis detector 6 in accordance with actions of the operation unit 3 as indicated by arrows LR, FB and UD, in order to output control signals of XYZ-axes to various devices 8 based on this received signal. The controller 7 is embodied by the microcomputer, e.g. USB-equipped PIC microcomputer.

The various devices 8 are computers enacting software requiring control of XYZ-axes, such as 3D-image display software, 3D-game software or 3D-CAD software, for example. Further, the various devices 8 are, for example, robots or medical devices, or may be applicable to devices requiring control of XYZ-axes. Further, the various devices 8 acts as, for example, computers enacting a browser, so that the controller 7 controls positions of pointers based on signals output from X-axis detector 4 and Y-axis detector 5, to control scroll of display in the browser upward or downward based on signals output from Z-axis detector 6.

Next, the operation unit of the input device according to this embodiment is set forth. As depicted in FIGS. 3-6, the operation unit 3 of the input device 1 according to this embodiment is provided with base 10, cover 11 and frontwall 12.

The base 10 is provided with placement unit 10a and connector 10b. On the placement unit 10a, the thumb T is placed when the operator moves the operation unit 3. The shape of the placement unit 10a is circular viewed from the above. The connector 10b connects the operation unit 3 with the body 2 and conveys actions of the operation unit 3 indicated by arrows LR, FB and UD to X-axis detector 4, Y-axis detector 5 and Z-axis detector 6.

The cover 11 is located at an upper portion of the base 10. The cover 11 is provided with side walls 11a and top cover 11b. The side walls 11a are respectively located at an upper portion of both edges in right-left direction of the placement unit 10a of the base 10. The top cover 11b is located over edges above the side walls 11a (right/left). The shape of top cover 11b is configured to cover the thumb T with the side walls 11a (right/left) and the top cover 11b when the operator places the thumb T on the placement unit 10a of the base 10. The frontwall 12 is a wall located in front of the cover 11.

The input device according to this embodiment 1 allows the operation unit 3 to move forward when the operator inserts the thumb T into the cover 11 of the operation unit 3 to move the thumb T forward as indicated by arrow F, to push the frontwall 12 by the tip of the thumb T. Y-axis detector 5 detects forward action of the operation unit 3 to output signal to the controller 7. The controller 7 outputs control signal of Y-axis to the various devices 8 based on signal from the Y-axis detector 5, allowing the input operation by the operator, to move the various devices 8 forward along Y-axis.

Further, the input device 1 of this embodiment allows the operation unit 3 to move upward when the operator inserts the thumb T into the cover 11 of the operation unit 3 to move the thumb T upward as indicated by arrow U, to push the cover 11 by the nail of the thumb T. Z-axis detector 6 detects upward action of the operation unit 3 to output signal to the controller 7. The controller 7 outputs control signal of Z-axis to the various devices 8 based on signal from the Z-axis detector 5, allowing the input operation by the operator, to move the various devices 8 upward along Z-axis Further, the input device 1 of this embodiment allows the operation unit 3 to move forward and upward when the operator inserts the thumb T into the cover 11 of the operation unit 3 to move the thumb T forward and upward as indicated by arrow FU, to push the frontwall 12 and the cover 11 by the tip and the nail of the thumb T. Y-axis detector 5 and Z-axis detector 6 detect forward and upward actions of the operation unit 3 to output signal to the controller 7. The controller 7 outputs control signal of Y-axis and Z-axis to the various devices 8 based on signal from Y-axis detector 5 and the Z-axis detector 6, allowing the input operation by the operator, to move the various devices 8 forward along Y-axis and upward along Z-axis.

As described, the input device 1 of this embodiment allows the operation unit 3 to move forward only by moving the thumb T forward if the operator wants to move the operation unit 3 forward. Further, it is possible to move the operation unit 3 upward only by moving the thumb T upward if the operator wants to move the operation unit 3 upward. Further, it is possible to move the operation unit 3 forward and upward only by moving the thumb T forward and upward if the operator wants to move the operation unit 3 forward and upward.

Therefore, the input device 1 of this embodiment allows an intuitive and easy input operation to a direction that was previously difficult for the conventional input device to direct. Thus, the input device 1 of this embodiment allows an intuitive and easy 3-dimensional input operation for an operator.

Hereinafter, the second embodiment of the input device is described. In this description, the common symbols are shown in portions in the input device according to this embodiment with regard to portions in the input device according to the first embodiment. The same description is omitted.

As depicted in FIGS. 7-10, the operation unit 3 of the input device 1 according to this embodiment is provided with base nail 20a. The base nail 20a is located on the rear edge of the placement unit 10a, having a convex shape thereon upward.

The input device 1 according to this embodiment 1 allows the operation unit 3 to move backward when the operator hooks a ventral portion of the thumb T on the base nail 20a to pull backward as indicated by arrow B1. Y-axis detector 5 detects backward action of the operation unit 3 to output signal to the controller 7. The controller 7 outputs control signal of Y-axis to the various devices 8 based on signal from the Y-axis detector 5, allowing the input operation by the operator, to move the various devices 8 backward along Y-axis.

As described, the input device 1 of this embodiment allows the operation unit 3 to move backward only by moving the thumb T backward if the operator wants to move the operation unit 3 backward, in addition to the advantageous effect by the input device according to the first embodiment.

Therefore, the input device 1 of this embodiment allows an intuitive and easy input operation to a direction that was previously difficult for the conventional input device to direct. Thus, the input device 1 of this embodiment allows an intuitive and easy 3-dimensional input operation for an operator.

Hereinafter, the second embodiment, variation 1 of the input device is described. In this description, the common symbols are shown in portions in the input device according to this variation embodiment with regard to portions in the input device according to the first embodiment. The same description is omitted.

As depicted in FIGS. 11-14, the operation unit 3 of the input device 1 according to this variation embodiment is provided with base nail 20b. The base nail 20b is located on the rear edge of the placement unit 10a', having a convex shape thereon upward. From view of above, the shape of the placement unit 10a' has a half-circle shape in its front-half and a half-ellipse shape in its back-half.

The input device 1 according to this variation allows the operation unit 3 to move backward when the operator hooks a ventral portion of the thumb T on the base nail 20b to pull backward as indicated by arrow B1.

Thus, the input device 1 of this variation allows movement of the thumb T shorter than the second embodiment, allowing easier backward movement of the thumb T, in addition to the advantageous effect by the input device according to the first and second embodiments. Thus, the input device 1 of this embodiment allows an intuitive and easy 3-dimensional input operation for an operator.

Hereinafter, the second embodiment, variation 2 of the input device is described. In this description, the common symbols are shown in portions in the input device according to this variation embodiment with regard to portions in the input device according to the first and second embodiments. The same description is omitted.

As depicted in FIG. 15, the operation unit 3 of the input device 1 according to this variation embodiment is provided with a plurality of base nails 20c. The base nails 20c are located on the upper surface of the placement unit 10a, having a convex shape thereon upward. Although not shown in figures, the base nails 20c are arranged in a row along edges of the placement unit 10a or along the Y-axis direction, for example. This example provides four base nails 20c with reference to FIG. 15 for explanation. However, more or less base nails 20c may be provided.

The input device 1 according to this variation allows the operation unit 3 to move backward when the operator hooks a ventral portion of the thumb T on the base nails 20c to pull backward. In addition to the advantageous effect by the input device according to the first and second embodiments, the input device 1 of this variation has another advantageous effect as follows: since a ventral portion of the thumb T is hooked on the plurality of base nails 20c, the thumb T is hooked more frequently than the second embodiment, allowing easier and surer backward movement of the operation unit 3.

Further, the input device 1 of this variation allows movement of the thumb T shorter than the second embodiment, allowing easier backward movement of the thumb T. Thus, the input device 1 of this embodiment allows an intuitive and easy 3-dimensional input operation for an operator.

Hereinafter, the second embodiment, variation 3 of the input device is described. In this description, the common symbols are shown in portions in the input device according to this variation embodiment with regard to portions in the input device according to the first and second embodiments. The same description is omitted.

As depicted in FIG. 16, the operation unit 3 of the input device 1 according to this variation embodiment is provided with base nail 20d. The base nail 20d is an inclination formed on the upper surface of the placement unit 10a.

The input device 1 according to this variation allows operation unit 3 to move backward when the operator hooks a ventral portion of the thumb T on the base nail 20d to pull backward. In addition to the advantageous effect by the input device according to the first and second embodiments, the input device 1 of this variation has another advantageous effect as follows: since a ventral portion of the thumb T is hooked on the base nails 20d, the thumb T is hooked more frequently than the second embodiment, allowing easier and surer backward movement of the operation unit 3.

Further, the input device 1 of this variation allows movement of the thumb T shorter than the second embodiment, allowing easier backward movement of the thumb T. Thus, the input device 1 of this embodiment allows an intuitive and easy 3-dimensional input operation for an operator.

Hereinafter, the second embodiment, variation 4 of the input device is described. In this description, the common symbols are shown in portions in the input device according to this variation embodiment with regard to portions in the input device according to the first and second embodiments. The same description is omitted.

Figure 17:
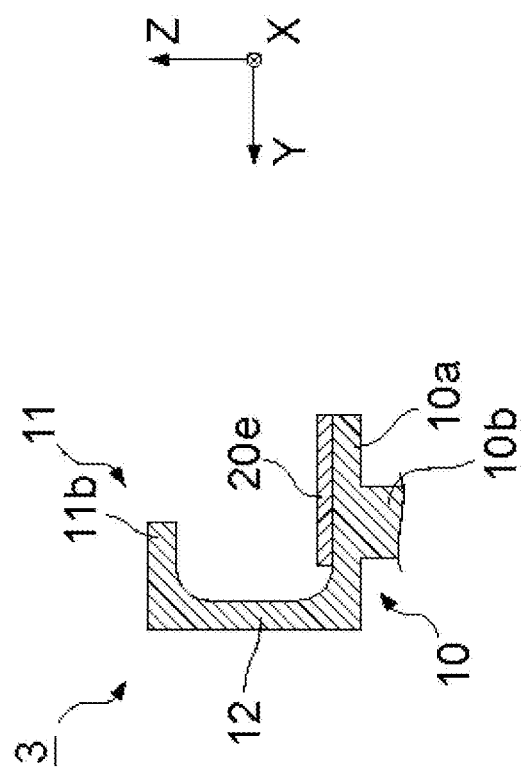
FIG. 17 is a sectional view that shows B-B section of an input device according to the second embodiment, variation 4.
Figure 21:
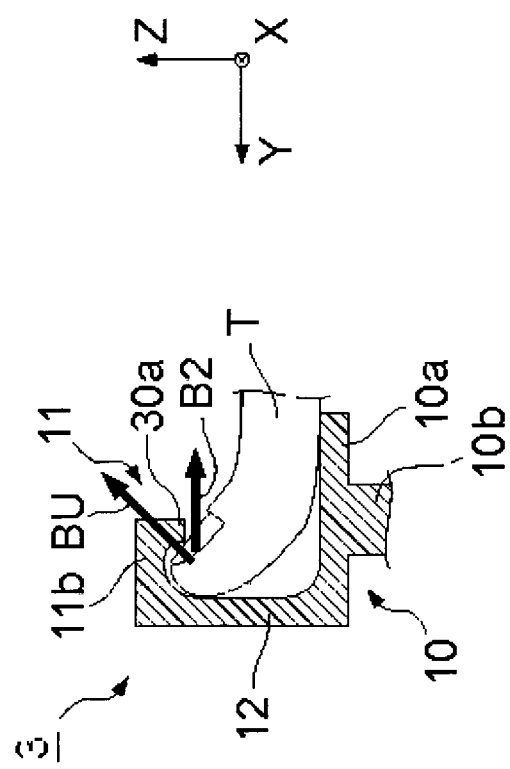
FIG. 21 is a sectional view that shows D-D section of an input device according to the third embodiment.

As depicted in FIG. 17, the operation unit 3 of the input device 1 according to this variation embodiment is provided with base nail 20e. The base nails 20e is located on the upper surface of the placement unit 10a. The material of the base nails 20e has a frictional coefficient too large for the thumb T to slip when a ventral portion of the thumb T is hooked on the base nail 20e. Alternatively, the material of the base nails 20e is elastic enough to deform when a ventral portion of the thumb T is hooked on the base nail 20e.

The input device 1 according to this variation allows the operation unit 3 to move backward when the operator hooks a ventral portion of the thumb T on the base nail 20e to pull backward. In addition to the advantageous effect by the input device according to the first and second embodiments, the input device 1 of this variation has another advantageous effect as follows: since a ventral portion of the thumb T is hooked on the base nails 20e, the thumb T is hooked more frequently than the second embodiment, allowing easier and surer backward movement of the operation unit 3.

Further, the input device 1 of this variation allows movement of the thumb T shorter than the second embodiment, allowing easier backward movement of the thumb T. Thus, the input device 1 of this embodiment allows an intuitive and easy 3-dimensional input operation for an operator.

Hereinafter, the third embodiment of the input device is described. In this description, the common symbols are shown in portions in the input device according to this embodiment with regard to portions in the input device according to the first embodiment. The same description is omitted.

As depicted in FIGS. 18-21, the operation unit 3 of the input device 1 according to this embodiment is provided with cover nail 30a. The cover nail 30a is located on the rear edge of the upper cover 11b of the cover 11, having a convex shape thereon downward.

The input device 1 according to this embodiment 1 allows the operation unit 3 to move backward when the operator inserts the thumb T into the cover 11 of the operation unit 3 to hook a nail portion of the thumb T on the cover nail 30a to pull backward as indicated by arrow B2. Y-axis detector 5 detects backward action of the operation unit 3 to output signal to the controller 7. The controller 7 outputs control signal of Y-axis to the various devices 8 based on signal from the Y-axis detector 5, allowing the input operation by the operator, to move the various devices 8 backward along Y-axis.

Further, the input device 1 of this embodiment allows the operation unit 3 to move backward and upward when the operator inserts the thumb T into the cover 11 of the operation unit 3 to hook a nail portion 30a of the thumb T on the cover nail 30a to pull backward and upward as indicated by arrow BU. Y-axis detector 5 and Z-axis detector 6 detect backward and upward actions of the operation unit 3 to output signal to the controller 7. The controller 7 outputs control signal of Y-axis and Z-axis to the various devices 8 based on signal from Y-axis detector 5 and the Z-axis detector 6, allowing the input operation by the operator, to move the various devices 8 backward and upward along Y-axis and Z-axis.

As described, the input device 1 of this embodiment allows the operation unit 3 to move backward and upward only by moving the thumb T backward or backward and upward if the operator wants to move the operation unit 3 backward or backward and upward, in addition to the advantageous effect by the input device according to the first embodiment.

Therefore, the input device 1 of this embodiment allows an intuitive and easy input operation to a direction that was previously difficult for the conventional input device to direct. Thus, the input device 1 of this embodiment allows an intuitive and easy 3-dimensional input operation for an operator.

Hereinafter, the third embodiment, variation 1 of the input device is described. In this description, the common symbols are shown in portions in the input device according to this variation embodiment with regard to portions in the input device according to the first embodiment. The same description is omitted.

As depicted in FIGS. 22-25, the operation unit 3 of the input device 1 according to this variation embodiment is provided with cover nail 30*b*. The cover nail 30*b* is located on the rear edge of the upper cover 11*b*' of the cover 11, having a convex shape thereon downward. From view of above, the shape of the upper cover 11*b*' has a half-circle shape in its front half and a half-ellipse shape in its back-half.

The input device 1 according to this variation allows the operation unit 3 to move backward when the operator inserts the thumb T into the cover 11 of the operation unit 3 to hook a nail portion of the thumb T on the cover nail 30*b* to pull backward as indicated by arrow B2. Further, the input device 1 of this embodiment allows the operation unit 3 to move backward and upward when the operator inserts the thumb T into the cover 11 of the operation unit 3 to hook a nail portion of the thumb T on the cover nail 30*b* to pull backward and upward as indicated by arrow BU.

Thus, the input device 1 of this variation allows movement of the thumb T shorter than the third embodiment, allowing easier backward movement of the thumb T, in addition to the advantageous effect by the input device according to the first and third embodiments. Thus, the input device 1 of this embodiment allows an intuitive and easy 3-dimensional input operation for an operator.

Hereinafter, the third embodiment, variation 2 of the input device is described. In this description, the common symbols are shown in portions in the input device according to this variation embodiment with regard to portions in the input device according to the first and third embodiments. The same description is omitted.

As depicted in FIG. 26, the operation unit 3 of the input device 1 according to this variation embodiment is provided with a plurality of cover nails 30*c*. The cover nails 30*s* are located on lower surface of the upper cover 11*b* of the cover 11, having a convex shape thereon downward. Although not shown in figures, the cover nails 30*c* are arranged in a row along edges of the upper cover 11*b*, for example. This example provides two base nails 30*c* with reference to FIG. 15 for explanation. However, more or less base nails 20*c* may be provided.

The input device 1 according to this variation allows the operation unit 3 to move backward or backward and upward when the operator hooks a nail portion of the thumb T on the cover nail 30*c* to pull backward or backward and upward.

In addition to the advantageous effect by the input device according to the first and third embodiments, the input device 1 of this variation has another advantageous effect as follows: since the thumb T is hooked on the plurality of cover nails 30*c*, the thumb T is hooked more frequently than the third embodiment, allowing easier and surer backward movement of the operation unit 3. Thus, the input device 1 of this embodiment allows an intuitive and easy 3-dimensional input operation for an operator.

Hereinafter, the third embodiment, variation 3 of the input device is described. In this description, the common symbols are shown in portions in the input device according to this variation embodiment with regard to portions in the input device according to the first and third embodiments. The same description is omitted.

Figure 27:
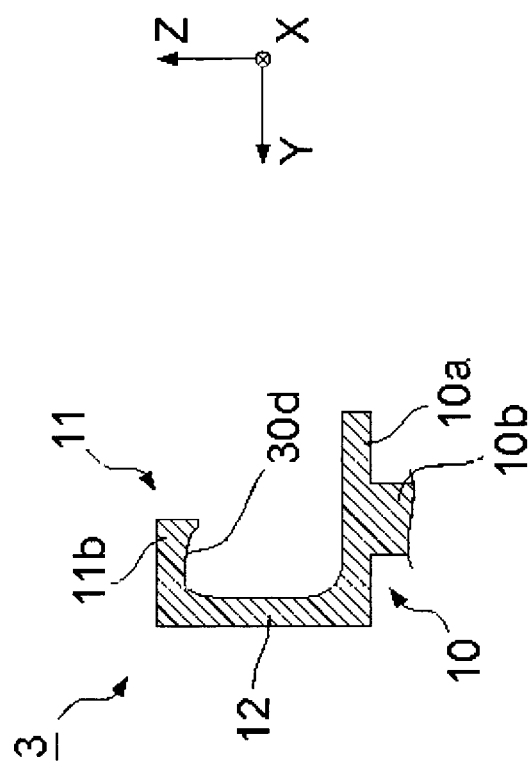
FIG. 27 is a sectional view that shows D-D section of an input device according to the third embodiment, variation 3.

As depicted In FIG. 27, the operation unit 3 of the input device 1 according to this variation embodiment is provided with cover nail 30*d*. The cover nail 30*d* is an inclination formed on the lower surface of the upper cover 11*b* of the cover 11.

The input device 1 according to this variation allows the operation unit 3 to move backward or backward and upward when the operator hooks a nail portion of the thumb T on the cover nail 30*d* to pull backward or backward and upward.

Thus, in addition to the advantageous effect by the input device according to the first and third embodiments, the input device 1 of this variation has another advantageous effect as follows: since the thumb T is hooked on the cover nail 30*d*, the thumb T is hooked more frequently than the third embodiment, allowing easier and surer backward or backward and upward movement of the operation unit 3. Thus, the input device 1 of this embodiment allows an intuitive and easy 3-dimensional input operation for an operator.

Hereinafter, the third embodiment, variation 4 of the input device is described. In this description, the common symbols are shown in portions in the input device according to this variation embodiment with regard to portions in the input device according to the first and third embodiments. The same description is omitted.

Figure 28:
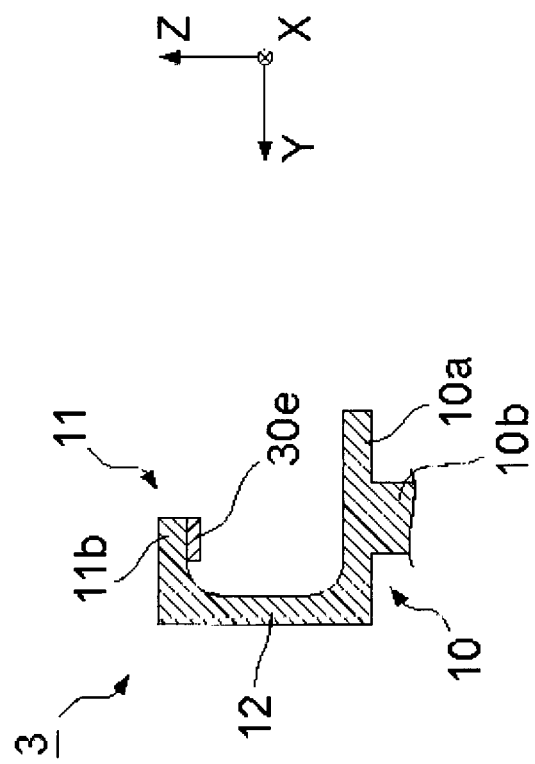
FIG. 28 is a sectional view that shows D-D section of an input device according to the third embodiment, variation 4.
Figure 29:
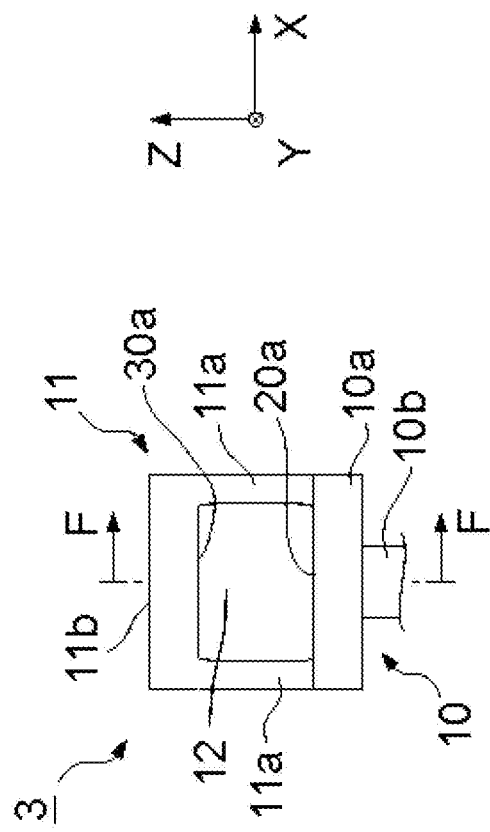
FIG. 29 is an elevation back view that shows an operation unit of an input device according to the fourth embodiment.
Figure 30:
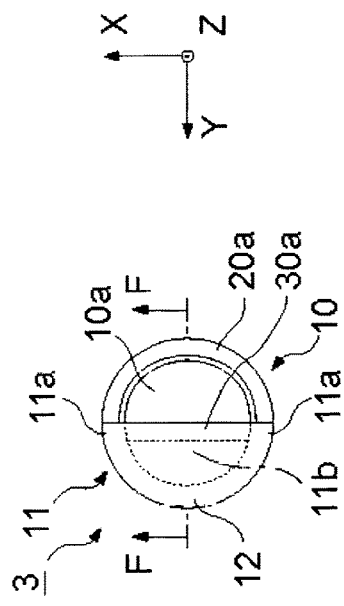
FIG. 30 is a plan top view that shows an operation unit of an input device according to the fourth embodiment.
Figure 31:
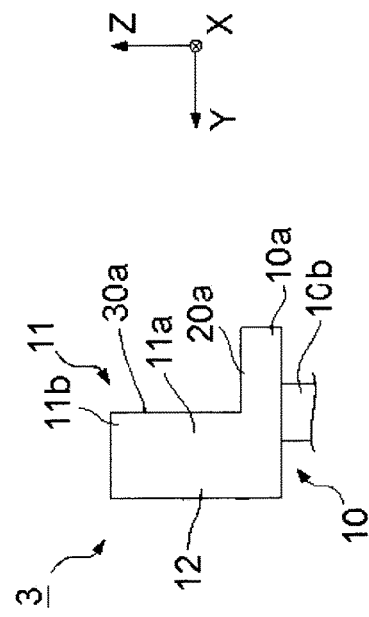
FIG. 31 is a left side view that shows an operation unit of an input device according to the fourth embodiment.
Figure 32:
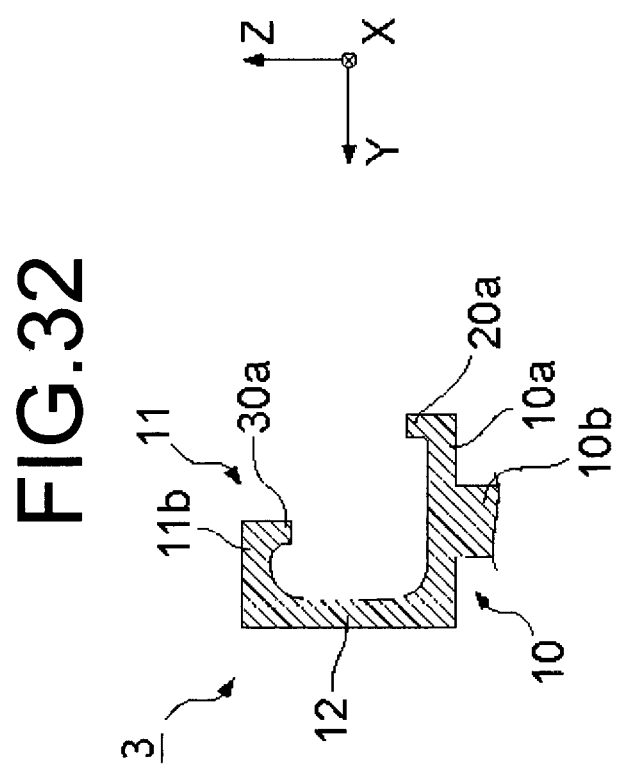
FIG. 32 is a sectional view that shows F-F section of an input device according to the fourth embodiment.
Figure 33:
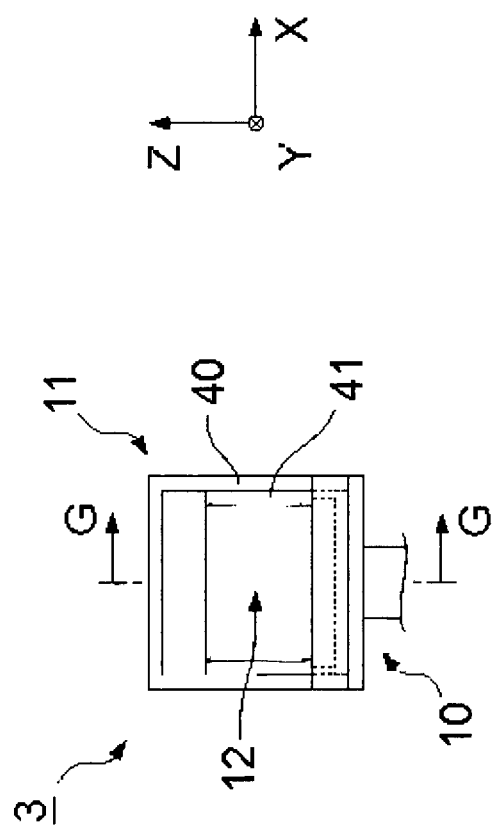
FIG. 33 is an elevation back view that shows an operation unit of an input device according to the fifth embodiment.
Figure 34:
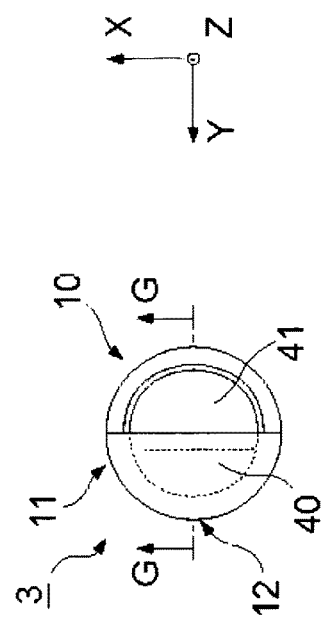
FIG. 34 is a plan top view that shows an operation unit of an input device according to the fifth embodiment.
Figure 35:
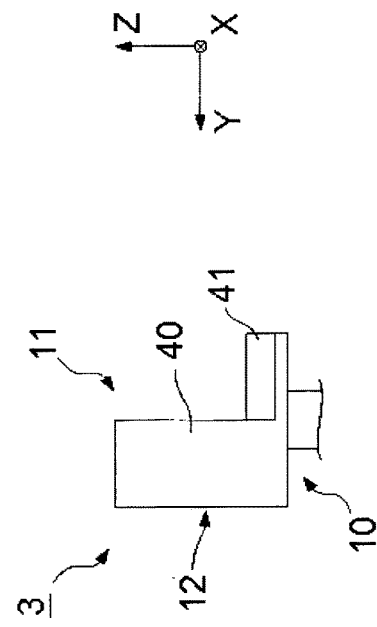
FIG. 35 is a left side view that shows an operation unit of an input device according to the fifth embodiment.
Figure 36:
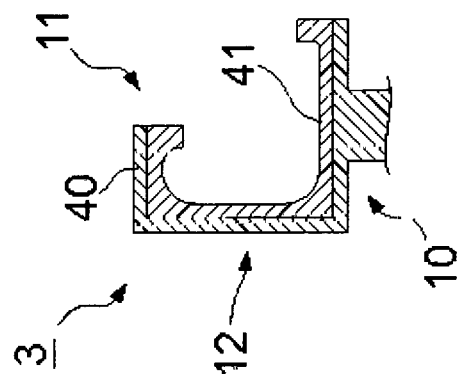
FIG. 36 is a sectional view that shows F-F section of an input device according to the fifth embodiment.

As depicted in FIG. 28, the operation unit 3 of the input device 1 according to this variation embodiment is provided with cover nail 30*e*. The cover nail 30*e* is located on the lower surface of the upper cover 11*b* of the cover 11. The material of the cover nail 30*e* has a frictional coefficient too large for the thumb T to slip when a nail portion of the thumb T is hooked on the cover nail 30*e*. Alternatively, the material of the cover nails 30*e* is elastic enough to deform when a nail portion of the thumb T is hooked on the cover nail 30*e*.

The input device 1 according to this variation allows the operation unit 3 to move backward or backward and upward when the operator hooks a nail portion of the thumb T on the cover nail 30*d* to pull backward or backward and upward.

Thus, in addition to the advantageous effect by the input device according to the first and third embodiments, the input device 1 of this variation has another advantageous effect as follows: since the thumb T is hooked on the cover nail 30*d*, the thumb T is hooked more frequently than the third embodiment, allowing easier and surer backward or backward and upward movement of the operation unit 3. Thus, the input device 1 of this embodiment allows an intuitive and easy 3-dimensional input operation for an operator.

Hereinafter, the fourth embodiment of the input device is described. In this description, the common symbols are shown in portions in the input device according to this embodiment with regard to portions in the input device according to the first to third embodiments. The same description is omitted.

As depicted in FIGS. 29-32, the operation unit 3 of the input device 1 according to this embodiment is provided with base nail 20*a*. The base nail 20*a* is located on the rear edge of the placement unit 10*a*, having a convex shape thereon upward. Further, the operation unit 3 of the input device 1 according to this embodiment is provided with cover nail 30*a*. The cover nail 30*a* is located on the rear edge of the upper cover 11*a* of the cover 11, having a convex shape thereon downward.

As described, the input device 1 of this embodiment allows the operation unit 3 to move to a desired direction only by moving the thumb T to a desired direction.

Therefore, the input device 1 of this embodiment permits an operator to intuitively and easily move the operation unit 3 to various directions, allowing an intuitive and easy input operation to various directions that were previously difficult for the conventional input device to direct. Thus, the input device 1 of this embodiment allows an intuitive and easy 3-dimensional input operation for an operator.

Hereinafter, the fourth embodiment of the input device is described. In this description, the common symbols are shown in portions in the input device according to this embodiment with regard to portions in the input device according to the first to fourth embodiments. The same description is omitted.

As depicted in FIGS. 33-36, the operation unit 3 of the input device 1 according to this embodiment is provided with an outer member 40 and an inner member 41. The material of the outer member 40 is different from that of the inner member 41. The member of the outer member 40 is harder to deform than that of the inner member 41. The member of the outer member 40 is resin material, e.g. thermoplastic resin such as general-purpose plastic, engineering plastic or super engineering plastic. As described, the material of the outer member 40 is a hard material. Thus, when the operator pushes the operation unit 3 by thumb T, the outer member 40 does not deform and conveys the action of the thumb T to X-axis detector 4, Y-axis detector 5 and the Z-axis detector 6 with no redundancy.

The member of the inner member 41 is easier to deform than that of the outer member 40.

The member of the inner member 41 is elastic material, e.g. thermoplastic elastomer or polyurethane. As described, the material of the inner member 41 is an elastic material. Thus, when the operator pushes the operation unit 3 by thumb T, the inner member 41 deforms and acts as a cushion, improving usability for the operator.

When the operator wants to move the operation unit 3 backward or backward and upward by the nail side of the thumb T, the inner member deforms so that the thumb T is hooked more frequently, allowing easier and surer backward or backward and upward movement of the operation unit 3. Thus, the input device 1 of this embodiment allows an intuitive and easy 3-dimensional input operation for an operator.

As described, first to fifth embodiments and their variations are set forth. Aside from the features set forth in the above mentioned embodiments and variations, it is possible to optimally combine the above mentioned embodiments and variations.

Further, first to fifth embodiments and their variations describes examples of the shape of the body 2 as held by one-hand. However, other shapes may be applicable. For example, the shape may be the same as a conventional controller for games grasped by both hands so that the input device 1 is installed in the conventional controller for games to locate the operation unit 3 at a knob portion of the conventional lever controller for games. In this case, the controller for games having a left lever and a right lever may have the input device 1 in the position of the left lever or the right lever, or in the positions of both the left lever and the right lever.

Some example methods being described here and in the incorporated documents, it is understood that one or more example embodiments may be varied through routine experimentation and without further inventive activity. For example, although input devices are shown in use with a particular base and hand grip, it is understood that other grips and appurtenant controller elements may be used by simply varying sizing, shape, and positioning of the controller. Variations are not to be regarded as departure from the spirit and scope of the exemplary embodiments, and all such modifications as would be obvious to one skilled in the art are intended to be included within the scope of the following claims.

What is claimed is:

1. An input device comprising:
   an operation unit movable with regard to a body;
   an X-axis detector that detects an action of the operation unit in an X-axis direction with regard to a body;
   a Y-axis detector that detects an action of the operation unit in an Y-axis direction that is perpendicular to the X-axis direction, with regard to a body; and
   a Z-axis detector that detects an action of the operation unit in a Z-axis direction that is perpendicular to the X-axis direction and the Y-axis direction, with regard to a body, wherein the operation unit includes,
   a base on which a thumb of an operator is placed,
   a cover located on an upper portion of the base in order to cover the thumb, wherein the cover and base are shaped to permit the thumb to move vertically upward off the base a distance without contacting or moving the operation unit vertically, and
   a frontwall that forms a wall located in front of the cover.

2. The input device according to claim 1, wherein the operation unit further comprises:
   a base nail on which a ventral portion of the thumb is hooked to pull backward.

3. The input device according to claim 1, wherein the operation unit further comprises:
   a cover nail on which a nail portion of the thumb is hooked to pull backward.

4. The input device according to claim 1, wherein the body is shaped to be grasped by only a single hand, and wherein the operation unit is centered above the body such that the thumb on the grasping hand coincides with the operation unit.

5. The input device according to claim 1, wherein the operation unit is movable with regard to the body in any combination of positive or negative directions along the X-axis, the Y-axis, and the Z-axis.

* * * * *